United States Patent [19]
de Leon et al.

[11] Patent Number: 5,386,935
[45] Date of Patent: Feb. 7, 1995

[54] CONFORMED CONTROL KNOB FOR FINGERTIP OPERATION OF A MANIPULATING LEVER

[75] Inventors: Gordon de Leon, Sunnyvale; Mary L. Reiber, Los Altos, both of Calif.

[73] Assignee: Anza Technology, Inc., Los Altos, Calif.

[21] Appl. No.: 94,567

[22] Filed: Jul. 20, 1993

[51] Int. Cl.6 ............................................. B23K 3/02
[52] U.S. Cl. ...................... 228/1.1; 228/32; 74/523
[58] Field of Search .......... 228/49.1, 1.1, 4.5, 228/32; 74/523, 557

[56] References Cited

U.S. PATENT DOCUMENTS

| | | | |
|---|---|---|---|
| 2,293,741 | 8/1942 | Lucia | 185/39 |
| 2,746,333 | 5/1956 | Penewell | 74/523 |
| 2,917,944 | 12/1959 | Hills | 74/526 |
| 2,941,418 | 6/1960 | Esser et al. | 74/523 |
| 3,179,260 | 4/1965 | Ferlen | 414/7 |
| 3,626,590 | 12/1971 | Miller | 228/1.1 |
| 4,200,166 | 4/1980 | Hansen | 74/523 |
| 4,516,939 | 5/1985 | Crimmins, Jr. | 434/114 |
| 5,175,534 | 12/1992 | Thatcher | 340/706 |

*Primary Examiner*—P. Austin Bradley
*Assistant Examiner*—Jeffrey T. Knapp
*Attorney, Agent, or Firm*—Flehr, Hohbach, Test, Albritton & Herbert

[57] ABSTRACT

A conformed control knob (23) is mounted to a manipulating lever (22) of an apparatus (20) having an arm (21) to be operably controlled by the manipulating lever (22). Through manual manipulation of the control knob (23), the arm (21) can be controlled for proportional precision movement. The control knob (23) includes an upwardly facing substantially planar support surface (25) formed for supporting at least one fingertip (26) of an operator's hand thereon, and includes a recess (27) formed therein to receive the fingertip (26). The support surface (26) is sufficiently cupped and the manipulating lever (22) is sufficiently biased upwardly toward the fingertip (26) to transmit both lateral and vertical movement of the operator's hand to the manipulating lever (22) for fingertip control thereof.

11 Claims, 4 Drawing Sheets

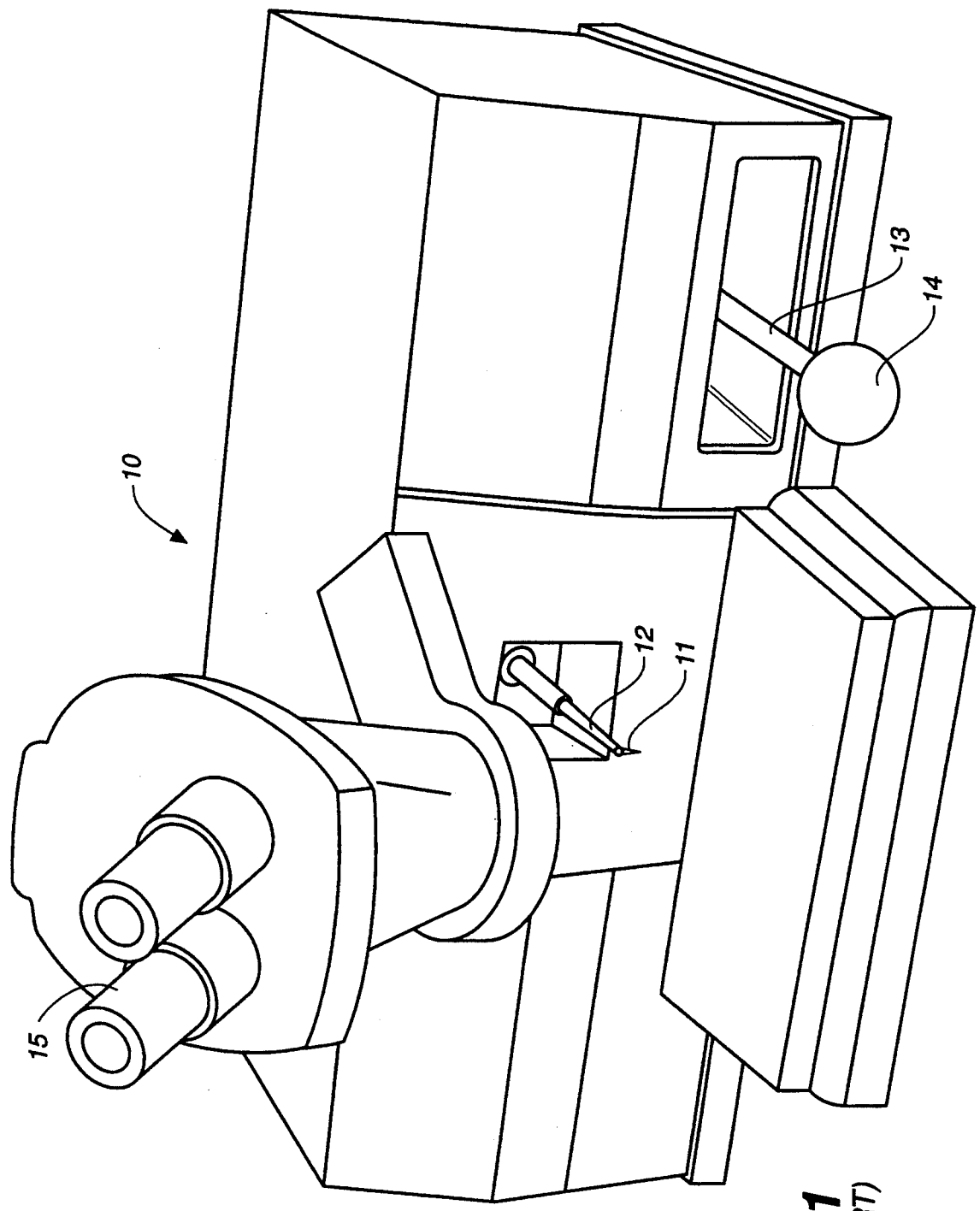
FIG._1
(PRIOR ART)

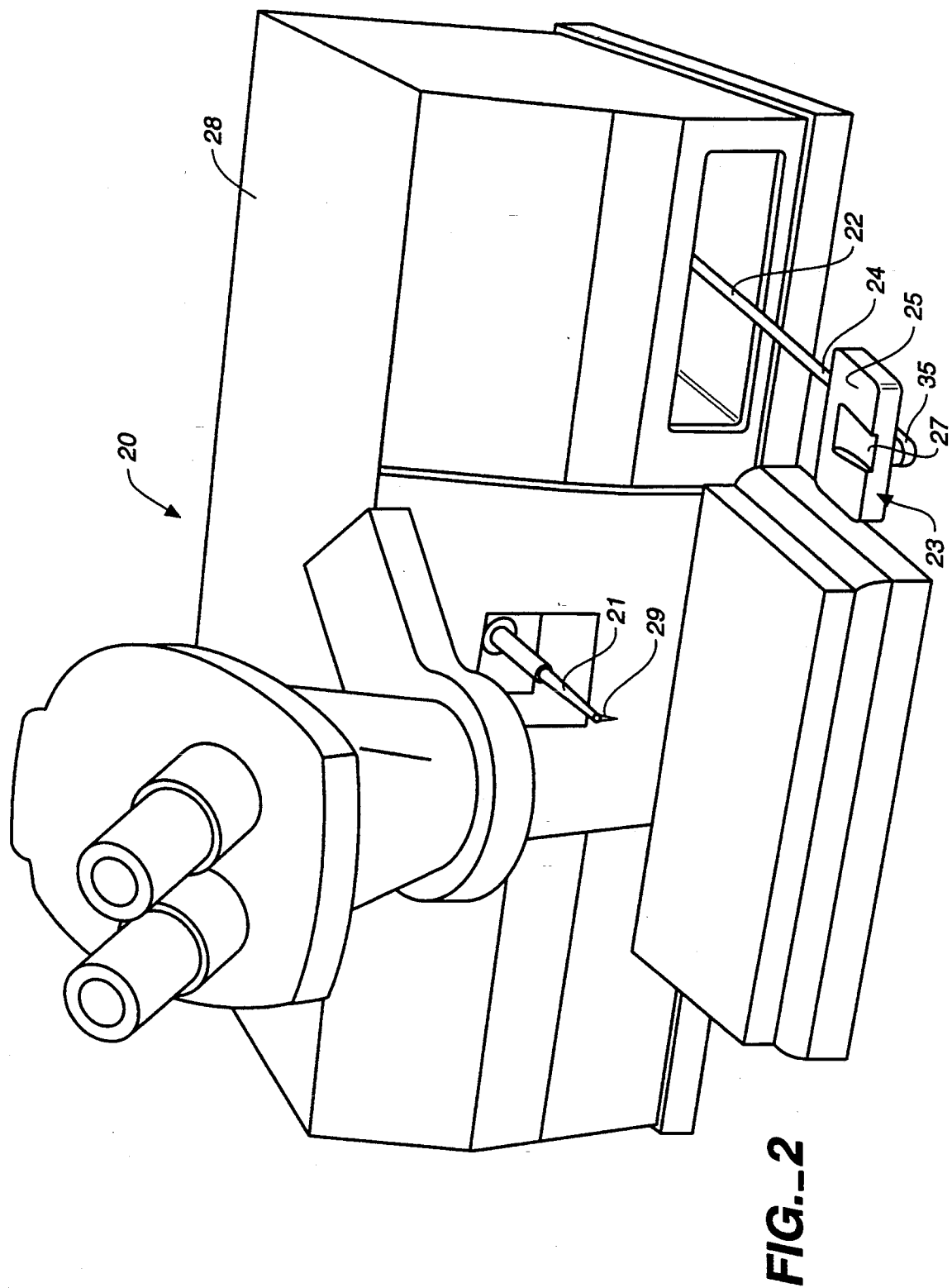

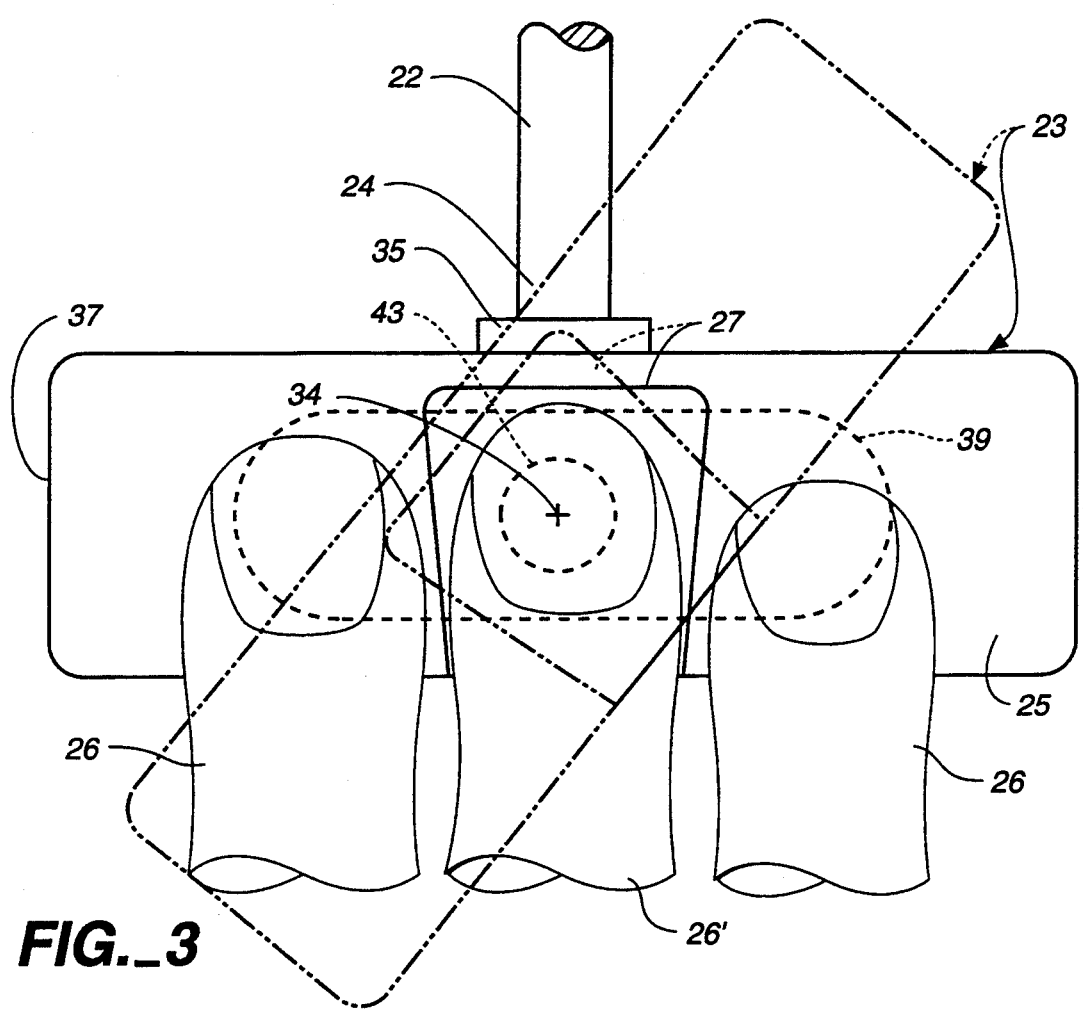
FIG._3
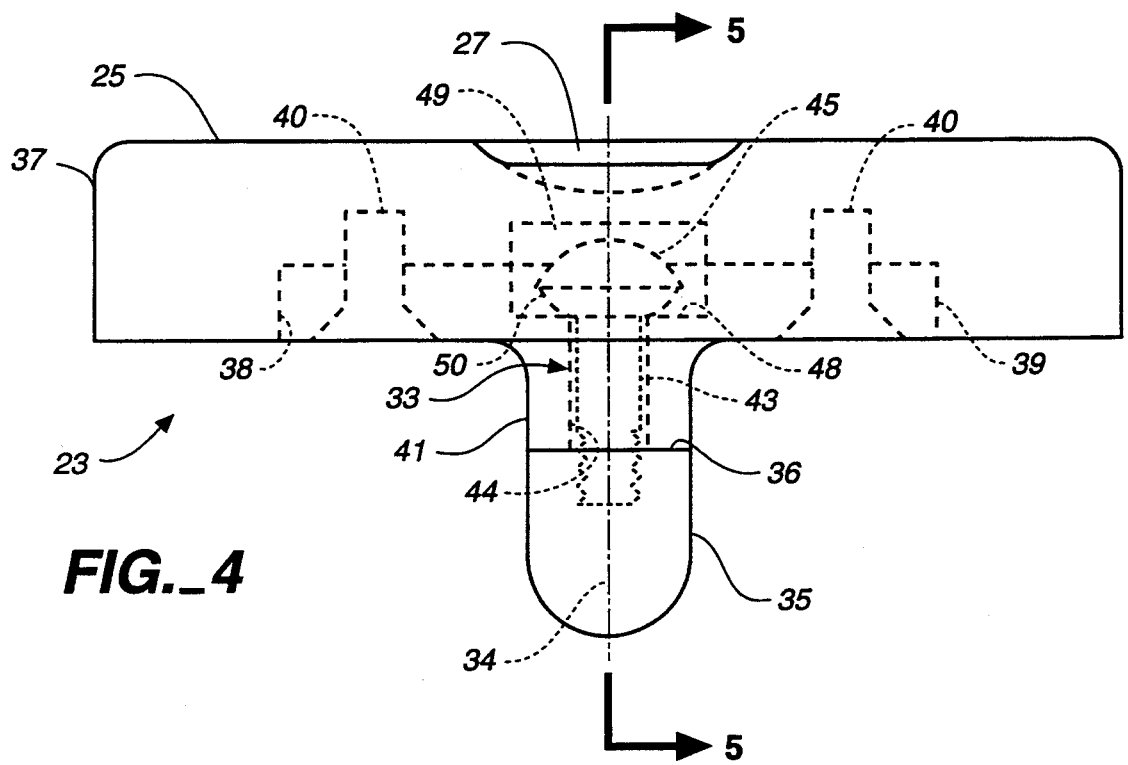
FIG._4

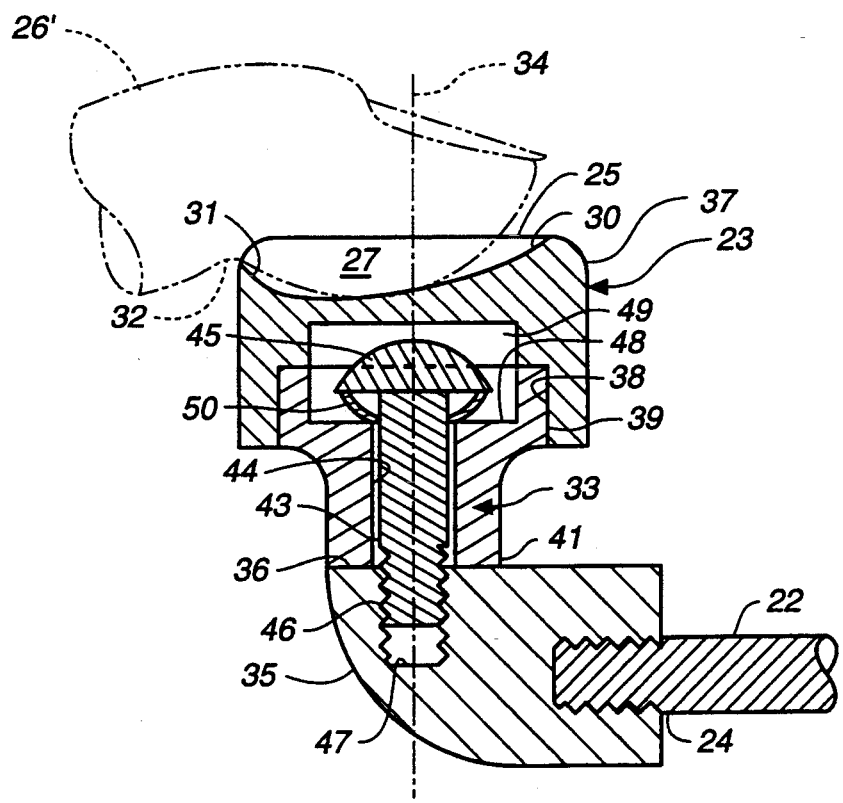
FIG._5

CONFORMED CONTROL KNOB FOR FINGERTIP OPERATION OF A MANIPULATING LEVER

TECHNICAL FIELD

The present invention relates, generally, to a wire bonding apparatus having a controllable arm and, more particularly, relates to a control knob for manually manipulating the arm.

BACKGROUND ART

Manufacturing automation or robotics have experienced exponential growth in the last decade, especially in integrated circuit production. Bare gold or plated single wires can be clamped and/or manipulated by automated machines, which in turn, bond the wires together, to a circuit board or the like.

While these machines may increase production, they are not always production feasible. First, they are extremely expensive to buy, install and maintain, and are not generally financially practical for smaller scale manufacturing. These machines, further, cannot be employed in all situations. For example, multiple fine insulated wires, which require removal or penetration of the insulation, cannot always be clamped by these automated machines. Since these fine wires are generally on the order of 1-2 mils in diameter, misplacement of the fine wire by as little as ½ mil, relative a circuit contact, can render the bond ineffective.

Accordingly, manually operated bonding machines, as shown in FIG. 1, have been developed which provide molecular welds to both bare and insulated fine wires. For instance, bifilar or trifilar leads can be bonded to thin-film heads for computer hard disk drives or the like. These bonding apparatus 10 typically include a bonding element 11 such as an ultrasonic tool disposed on an end of an arm 12 to be controlled. Through manual manipulation of a manipulating lever 13 which is operably coupled to arm 12, proportional precision movement of the bonding element can be controlled.

Typically, as shown in FIG. 1, a conventional spherical knob 14 is mounted to the distal end of lever 13 for control and manual manipulation thereof. Knob 14 is formed to be grasped in the operator's palm or between multiple fingers for movement of the manipulating lever 13.

One problem associated with these spherical knobs is that they become difficult to grasp when continuously maneuvered over long periods of time. Eventually the continuous gripping causes the operator's wrist to fatigue resulting in unsteady operation of manipulating lever 13. Such unsteady operation is further magnified by the fact that the bonding operations are usually observed under a microscope 15 since the wires are of such a small diameter.

Another problem associated with these spherical knobs is that they are often difficult to physically relocate after the operator has moved his hands from the knob. Because the spherical knob is relatively small, the operator generally must visually relocate the knob for manual operation. Cumulatively, a substantial amount of time is wasted.

DISCLOSURE OF INVENTION

Accordingly, it is an object of the present invention to provide a conformed control knob for a manipulating lever which promotes fingertip operation of the knob.

Another object of the present invention to provide a conformed control knob which enhances vertical and lateral manipulation of the lever.

Still another object of the present invention is to provide a conformed control knob for use with a bonding machine.

Yet another object of the present invention is to provide a conformed control knob which enhances physical relocation thereof.

It is a further object of the present invention to provide a conformed control knob for the manipulating lever which is durable, compact, easy to maintain, has a minimum number of components, and is easy to use by unskilled personnel.

In accordance with the foregoing objects, the present invention provides an apparatus having an arm to be controlled and a manipulating lever operably coupled to the arm. Through manual manipulation of a control knob positioned on an end of the manipulating lever, the arm can be controlled for proportional precision movement. The control knob includes an upwardly facing substantially planar support surface formed for supporting at least one fingertip of an operator's hand thereon. The support surface includes a recess formed therein to receive the fingertip. Further, the support surface is sufficiently cupped and the manipulating lever is biased upwardly toward the fingertip to transmit both lateral and vertical movement of the operator's hand to the manipulating lever.

BRIEF DESCRIPTION OF THE DRAWING

The assembly of the present invention has other objects and features of advantage which will be more readily apparent from the following description of the best mode of carrying out the invention and the appended claims, when taken in conjunction with the accompanying drawing, in which:

FIG. 1 is a top perspective view of a bonding apparatus employing a prior art conventional spherical control knob.

FIG. 2 is a top perspective view of a bonding apparatus employing a control knob constructed in accordance with the present invention.

FIG. 3 is a fragmentary enlarged top elevation view of the control knob of FIG. 2 illustrating operating engagement with an operator's fingers and the pivotal movement of the knob.

FIG. 4 is a front elevation view of the control knob of FIG. 3.

FIG. 5 is an enlarged, fragmentary, side elevation view, in cross-section, of the control knob taken substantially along the line of plane 5—5 in FIG. 4.

BEST MODE OF CARRYING OUT THE INVENTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIG. 2 where a manipulating apparatus, generally designated 20, is shown having an arm 21 to be controlled and a manipulating lever 22 operably coupled to the arm. Through manual manipulation of a control knob, generally designated 23, positioned on an end 24 of manipulating lever 22, arm 21 can be controlled for proportional precision movement. Control knob 23 includes an upwardly facing support surface, generally designated 25, formed for supporting at least one fingertip 26 (FIG. 3) of an operator's hand thereon. The support surface 25 includes a recess, generally designated 27, formed therein to receive the fingertip. Further, the support surface is sufficiently cupped and the manipulating lever is sufficiently biased upwardly toward the fingertip to transmit both lateral and vertical movement of the operator's hand to the manipulating lever.

Briefly, apparatus 20 is preferably a bonding device, formed of bonding bare or insulated fine wires, which includes a housing 28 having a control arm extending therefrom. Control arm 21 includes a bonding element 29, such as an ultrasonic element or a heating element, disposed on an end thereof to be controlled by manipulating lever 22 operably coupled to the control arm for proportional precision movement of bonding element 29. Further, manipulating lever 22 is biased upward which positions bonding element 29 upward as a result.

As best viewed in FIGS. 3 and 4, control knob 23 is preferably rectangular-shaped such that support surface 25 provides an elongated substantially planar surface. Accordingly, one or more fingertips can be supported on top thereof where one fingertip 26' is placed or received in recess 27 (FIG. 3). Preferably, fingertip 26' is the operator's middle finger, while the two adjacent fingertips 26 on opposite sides thereof are to be positioned and supported atop planar support surface 25 for additional support and control. This configuration further enhances physical relocation of the control knob because the surface area of the support surface is larger. Hence, the ability to relocate the control knob without visual aid is increased.

It will be understood, however, that only one or two fingers need be supported for fingertip control of manipulation lever 22. In addition, support surface 25 may define more than one fingertip conformed recess for additional fingertip control without departing from the true spirit and nature of the present invention.

FIGS. 4 and 5 illustrate that recess 27 is semiellipsoid-shaped for comfortable conformation with middle fingertip 26'. Thus, once fingertip 26' is positioned in the recess, a wall 30 of support surface 25, which forms recess 27, sufficiently cups the middle fingertip therein. Importantly, a back portion 31 of wall 30 is sloped upwardly (FIG. 5) and formed to seat into a joint 32 of middle finger 26' for engagement therewith. This is particularly suitable to transmit lateral movement of the fingertip to the control knob, and subsequently, to the manipulating lever. Accordingly, the combination of the manipulating lever being biased upwardly toward the middle finger and recess wall 30 being sufficiently cupped facilitates transmission of both lateral and vertical movement of the operator's hand to the manipulating lever for fingertip control.

In accordance with the present invention, a rotatable element, generally designated 33, rotatably mounts control knob 23 to manipulating lever 22 for rotational movement of support surface 25 in a substantially horizontal plane. As best viewed in FIG. 3 (in phantom lines), support surface 25 rotates about an axis 34 so that the support surface and the recess can be oriented at a convenient comfortable position relative the operator's hand. Thus, the operator's fingertips can be supported on surface 25 at a natural angle, relative the microscope and the operator's body, which will reduce strain and fatigue of the operator's hand.

Rotatable element 33 preferably includes an elbow member 35 mounted to end 24 of manipulating lever 22 and having an upward facing mounting surface 36 upon which knob 23 is rotatably supported. FIGS. 4 and 5 show that control knob 23 includes a base member 37 forming support surface 25 on a topside and a bottom hollow 38 on an opposite side thereof. The knob further includes a plate member 39 formed and dimensioned to inset in bottom hollow 38 which is affixed to base member 37 through fasteners 40. Extending downwardly from plate member 39 is a column support 41 which is positioned atop elbow mounting surface 36 for rotatable support.

A bolt member 43 is positioned through a hole 44 extending through plate member 39 and column support 41. One end of bolt member 43 includes a head portion 45 formed to rotatably secure the control knob about axis 34 of bolt member 43 so that support surface 25 can rotate in a substantially horizontal plane. An opposite lever mounting end 46 of the bolt member extends into a threaded aperture 47 of elbow member 35. FIG. 5 shows that an interior wall 48 of plate member 39 together with base bottom hollow 38 form a cavity 49 dimensioned to rotatably receive head portion 45 therein for rotation about bolt axis 34.

In the preferred form of the present invention, a spring member 50 (FIG. 5) is disposed in cavity 49 which causes resistance between rotatable element 33 and control knob 23 so that the knob will not rotate uncontrollably about bolt axis 34. Hence, support surface 25 may be manually rotated about axis 34 to the desired natural orientation where it will be retained unless manually moved to a new rotational position.

Spring member 50 is preferably provided by a wave washer having one end abutting bolt head portion 45 and an opposite end engaging interior wall 48 of the plate member. As bolt member 43 is threaded into aperture 47, wave washer 50 is increasingly tensioned to cause a greater resistance to rotational movement of the control knob about bolt axis 34. Accordingly, the resistance can be adjusted to a desired degree.

What is claimed is:

1. In an apparatus having an arm to be controlled and a manipulating lever operably coupled to said arm for proportional precision movement of said arm through manual manipulation of a control knob positioned on an end of said manipulating lever, the improvement in said apparatus comprising:

said control knob including an upwardly facing and substantially planar support surface formed for supporting at least one fingertip of an operator's hand thereon, said support surface having a recess formed therein to receive said at least one fingertip, said surface defining said recess being sufficiently cupped and said manipulating lever being upwardly biased to transmit both lateral and vertical movement of said operator's hand to said manipulating lever.

2. The apparatus as defined in claim 1 wherein,
said control knob is rectangular-shaped.

3. The apparatus as defined in claim 1 wherein,
said recess is semiellipsoid-shaped.

4. The apparatus as defined in claim 1 wherein,
said arm includes a precision tool on an end thereof operably manipulated through manipulation of said control knob.

5. The apparatus as defined in claim 4 wherein,
said apparatus comprises a bonding machine for heat bonding fine wires, and
said precision tool comprises an ultrasonic bonding element.

6. An apparatus for manipulating an arm to be controlled comprising:
a housing;
an arm having a precision tool affixed to one end and having an opposite end mounted to said housing for three-dimensional precision movement;
a manipulating lever operably coupled to said arm for proportional precision movement of said tool through manual manipulation of said lever; and
a control knob positioned on an end of said lever for manual manipulation thereof, said control knob including a substantially planar support surface formed for supporting at least one fingertip of an operator's hand thereon, said support surface having a recess formed therein to receive said at least one fingertip, said surface defining said recess being sufficiently cupped and said manipulating lever being biased toward said support surface engaged by said at least one fingertip to transmit both lateral and vertical movement of said operator's hand to said manipulating lever.

7. The apparatus as defined in claim 6 wherein,
said support surface is upwardly facing, and
said manipulating lever is upwardly biased.

8. The apparatus as defined in claim 7 further including:
a rotatable element rotatably mounts said control knob to said manipulating lever for rotational movement of said support surface in a substantially horizontal plane.

9. The apparatus as defined in claim 8 wherein,
said rotatable element includes a bolt member having a head portion on one end thereof formed to pivotally mount said knob about an axis of said bolt member, and having an opposite lever mounting end mounted to said manipulating lever.

10. The apparatus as defined in claim 9 wherein,
said control knob includes an interior wall defining a cavity formed for rotatable receipt of said bolt head portion therein, and
said rotatable element further includes a spring member having one end abutting said bolt head portion and an opposite end engaging said interior wall in a manner causing resistance to said rotational movement.

11. The apparatus as defined in claim 10 wherein,
said spring member is a wave washer.

* * * * *